Dec. 15, 1964 P. KUMMER 3,161,096
DEVICE FOR ADJUSTING THE WORKING POSITION
OF TOOLS IN A MACHINE TOOL
Filed July 3, 1961
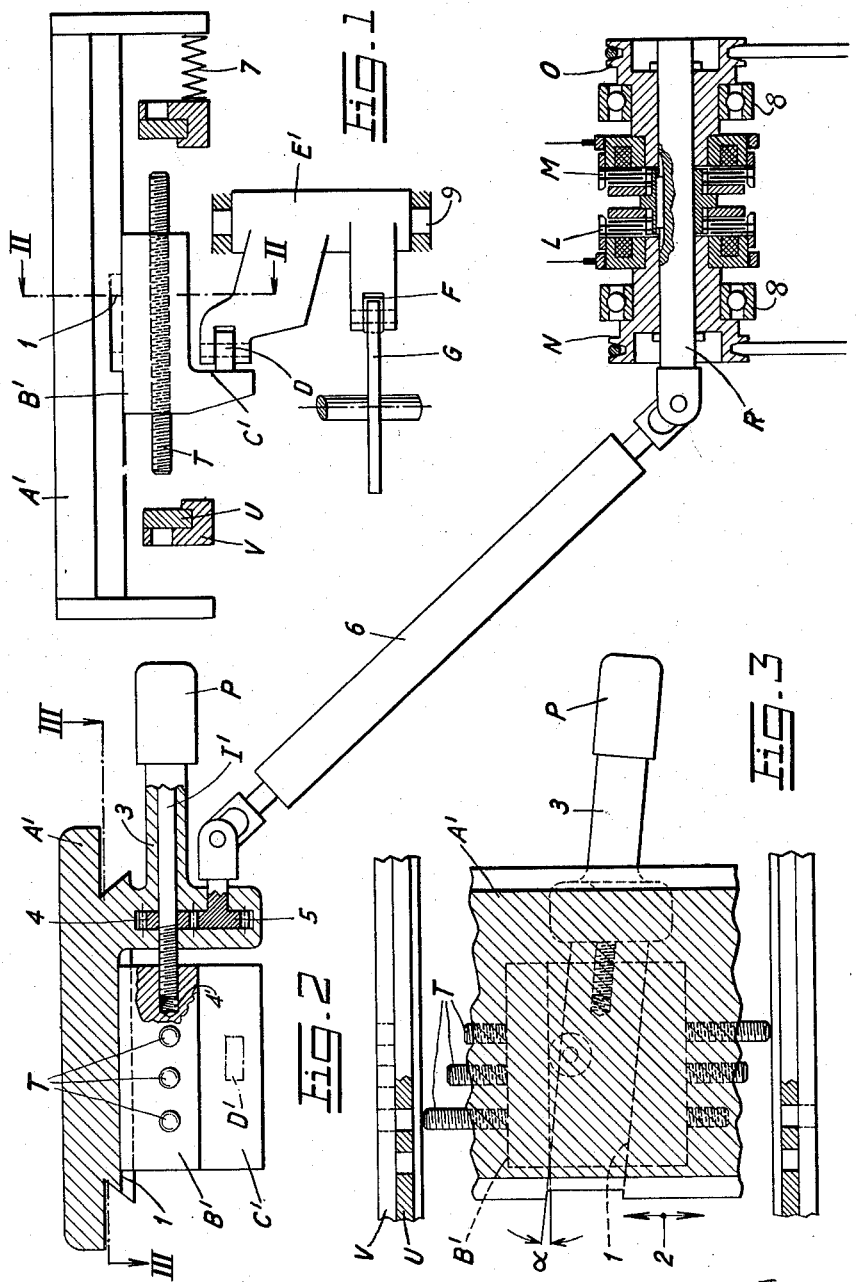
Inventor
Pierre Kummer
By Stevens, Davis, Miller & Mosher
Attorneys ID 3,161,096
Patented Dec. 15, 1964

3,161,096
DEVICE FOR ADJUSTING THE WORKING POSITION OF TOOLS IN A MACHINE TOOL
Pierre Kummer, Tramelan, Switzerland, assignor to Kummer Frères S.A. Fabrique de Machines, Tramelan, Switzerland
Filed July 3, 1961, Ser. No. 121,643
Claims priority, application Switzerland, July 15, 1960, 8,109/60
4 Claims. (Cl. 82—24)

The present invention relates to a device for finely adjusting the working position of tools in a machine tool, more especially in a lathe.

Machine tools and in particular lathes in which the working position of a slide carrying a tool is controlled by camming means acting on the slide by means of a rocker arm provided with a conical roller are already known in the art. In these known devices the conical roller can be adjusted by moving it in the direction of the rocking axis of said arm by means of a micrometric screw actuated by hand. Similar adjusting devices have been used in particular in copying machine tools such as for example copying lathes or milling machines. In these cases the conical roller is mounted either on the slide itself or on pantagraph arm or on a similar member.

The present invention aims to improve the device of the above mentioned kind to provide still greater accuracy and reduce wear.

According to the invention a rule having a sideface perpendicular to the direction of movement of the slide is guided on this slide to be adjustable in a direction which is almost but not entirely perpendicular to said direction of movement, one of the rollers of said rocking lever acting on this sideface, and automatic adjusting means are provided, which act by moving said rule with regard to said slide.

The accompanying drawings represent, by way of example and somewhat diagrammatically, one embodiment of the device of the invention, but only insofar as is deemed necessary for a good understanding.

FIG. 1 is an elevational view of the device;
FIG. 2 is a partial transversal section view along line II—II of FIG. 1 and
FIG. 3 is a horizontal section view along line III—III of FIG. 2.

The reference A' denotes a tool-carrying slide of a lathe. This slide has on its underside a slideway 1 for a rule B' which has a sideface C' perpendicular to the direction of movement indicated by the arrow 2 in FIG. 3 of the slide A'. The slideway 1 is inclined by the angle α to the face C'; this angle α is small, for example 10°. The rule B' is thus capable of being adjusted on the slide A' in a direction which is almost, but not entirely perpendicular to said direction of movement 2.

A spring 7 acting on slide A' is effective in keeping face C' of rule B' in engagement with a cylindrical roller D' mounted on one of the arms of a rocking lever E' mounted for pivotal movement on a fixed axis 9. The other arm of this lever carries a cylindrical roller F which engages the profile of a rotating slide-controlling cam G which rotates about cam shaft 10 as is usual in automatic lathes.

A screw spindle I' is mounted in a support 3 integral with, or rigidly secured to, the slide A', to be rotatable but axially fixed. Its threaded portion is in screwing engagement with a threaded hole 4' provided in the rule B'. A pair of toothed wheels 4, 5 and a telescopic shaft 6 with universal joints provide a driving connection between the screw spindle I' and a shaft R which is mounted for rotation in fixed bearings 8. This shaft R may at one time be rotated in one direction by means of the constantly rotating pulley N and the electromagnetic clutch L, at another time be rotated in the opposite direction by means of the constantly rotating pulley O and the electromagnetic clutch M, and at still other times be at rest (if both clutches are de-energized).

In our example, if clutch L is energized the rule B' is moved towards the left (FIG. 1), whilst if clutch M is energized the rule B' is moved to the right. A high precision potentiometer P is fixed to support 3 and its movable part is actuated by the screw spindle I'.

If the slide A' carries only one tool the working position of which is to be finely adjusted, then the screw spindle I' might be actuated by hand (and the parts 4, 5, 6, L, M, N, O, P, R would be omitted). The device is however more particularly intended to be used in an arrangement serving to carry out the fine adjustment of the working position of each of several tools fixed to the slide A'.

Such an arrangement is more particularly described in copending application Ser. No. 54,316 filed September 6, 1960, which is assigned to the present assignee now Patent Number 3,138,046, and comprises electric means including the potentiometer P, for controlling the clutches L and M. In this copending application the device claimed in the present application has been represented and shortly described as an example of the mechanical portion of the whole arrangement.

It should be noted that the device claimed in the present application may be advantageously used on a known kind of automatic lathe in which the slide A' is equipped with abutment screws cooperating successively with a stationary abutment member, so that at the end of a first advance movement of the slide A' the abutment screw corresponding to tool No. 1 engages said member when this tool works, whilst at the end of a second advance movement of slide A' the abutment screw corresponding to tool No. 2 engages said members when this tool works, and so on; the working position of each tool is thus not eventually determined by the profile of the cam G which operates the slides, but more accurately by the cooperation of each of the abutment screws with the abutment member. It should be understood that the rocking lever E' includes a resilient portion which yields at the end of each advance movement of the slide A'.

In the improved device represented in the drawings, there are three such abutment screws denoted with T and cooperating successively, as in the machine tools of the known kind, with an abutment member U mounted to be slidable on a fixed support V in a direction perpendicular to the direction of movement 2 of slide A'. This abutment member U has two holes and is cam-controlled so that on each advance of the slide A' these two holes are aligned on two of the three advance screws, whilst the third one of these screws will abut against the member U. At each slide advancement the final position of the rule B' will therefore be determined by one of the screws T which may be adjusted, once for a particular work, on the rule B'. It is important to note that in such a construction, the improved device claimed in this application is very useful too; in fact, every time when the rule B' is moved by means of the screw spindle I', the forward end face of that one of the screws T which is active moves parallelly to a surface of member U which is parallel to the sideface C' and the fine adjusting movement of rule B' produces a corrective adjustment of slide A' and ultimately, on engagement of said screw T with member U, a corresponding adjustment of the final position of slide A'.

This result is due to the fact that the screws T are mounted on the rule B' whilst hitherto they were mounted on the slide A'.

What I claim is:
1. A device for effecting the fine adjustment of the working position of tools of a machine tool comprising a movable slide on which the tools are mounted, a rule member slidably mounted in a slideway on said movable slide in a direction at a slight angle to a line perpendicular to the direction of movement of said movable slide, said rule member having a surface dependent therefrom and parallel to the sides of said movable slide as well as being perpendicular to the direction of movement thereof, a rocking lever pivotally mounted on a shaft, said rocking lever having a first arm and a second arm, roller means mounted on each arm, cam means disposed on another shaft, biasing means engaging said movable slide to maintain said roller means in operative engagement with said surface of said rule member and said cam means, and adjusting means operatively connected to said rule member to move same with respect to said movable slide to adjust the position thereof.

2. A device according to claim 1, in which said adjusting means further include a plurality of abutment screw members mounted in said rule member parallel to the direction of movement of said movable slide, and spaced fixed abutment members with faces mounted on each side of said rule member with said faces perpendicular to the direction of movement of said movable slide and adapted to be engaged by said abutment screw members to denote a final adjustment of movable slide.

3. A device according to claim 1 in which said adjusting means include a screw spindle mounted on said movable slide to be rotatable, but axially fixed with regard to same, said screw spindle being in screwing engagement with said rule member to move same and drivingly connectable with driving means for its rotation in either direction.

4. A device according to claim 3, in which said driving means include gear means connected to said screw spindle, a telescopic shaft having one end connected to said gear means, a shaft member having the other end of said telescopic shaft connected thereto, and clutch means operatively connected to said shaft member to effect rotation in either direction to drive said shaft member, telescopic shaft, gear means and screw member to move said rule member.

References Cited by the Examiner
UNITED STATES PATENTS

| | | | |
|---|---|---|---|
| 1,277,801 | 9/18 | Whitehouse et al. | 82—5 |
| 2,208,319 | 7/40 | Bickel | 82—19 X |
| 2,527,397 | 10/50 | Castelli | 82—5 X |

WILLIAM W. DYER, JR., *Primary Examiner.*
RICHARD H. EANES, JR., *Examiner.*